No. 891,949. PATENTED JUNE 30, 1908.
F. C. NEWELL.
MUTOGRAPH.
APPLICATION FILED APR. 24, 1906.

WITNESSES
J. C. Bradley
F. E. Gaither

INVENTOR
Frank C. Newell
by atty
Paul Synnestvedt

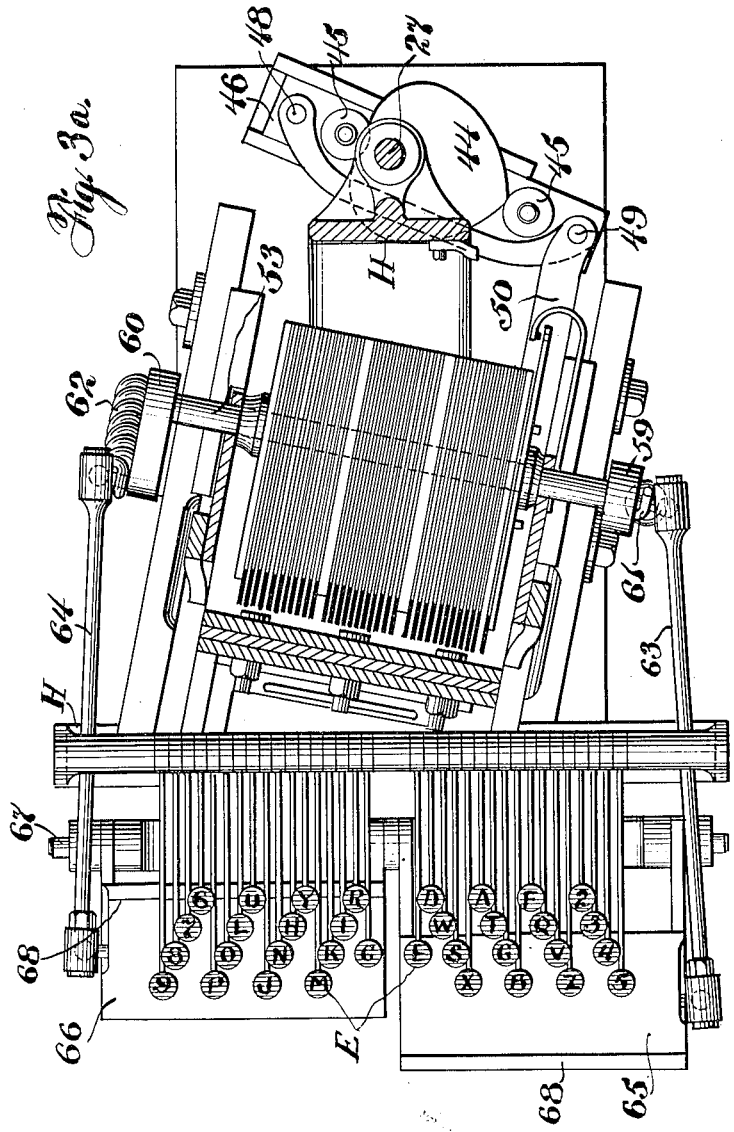

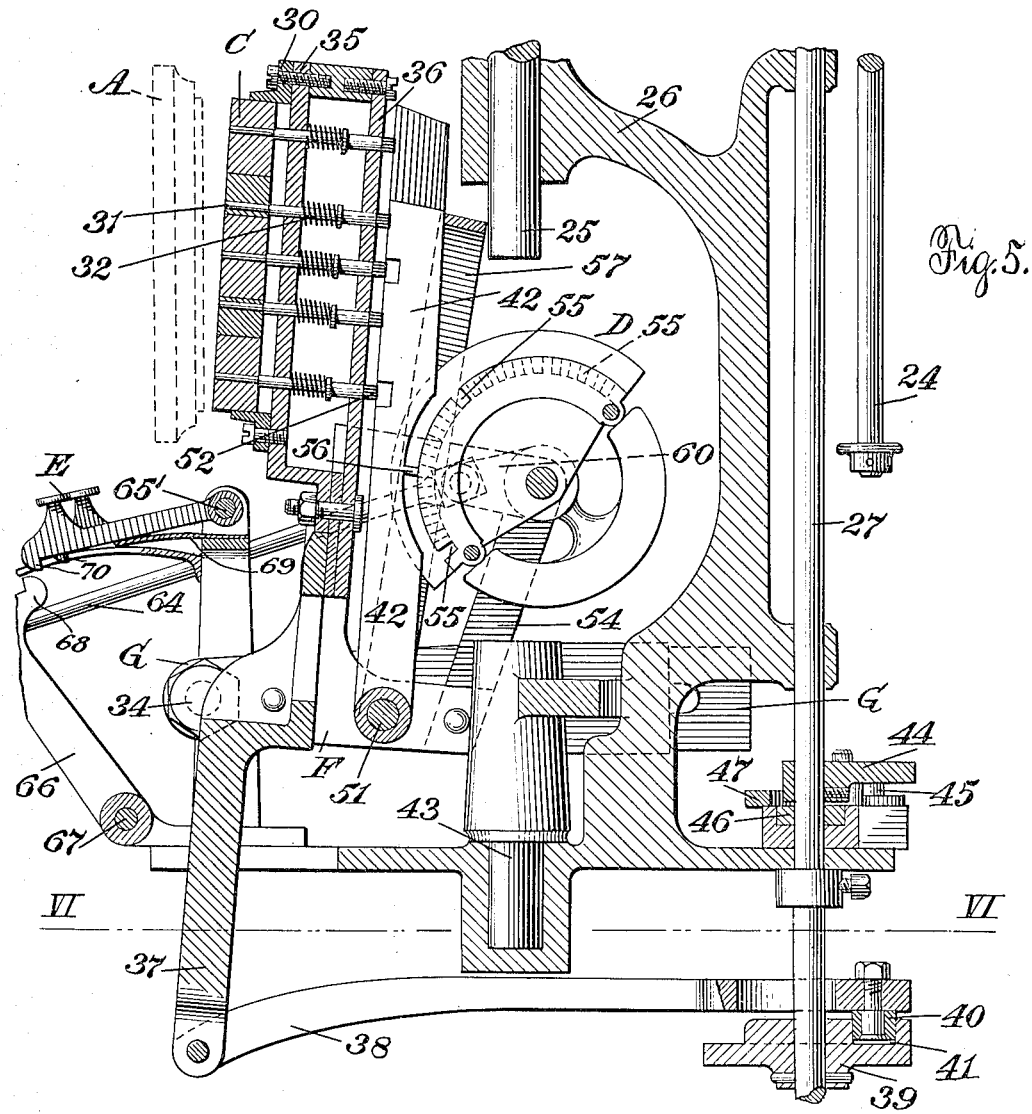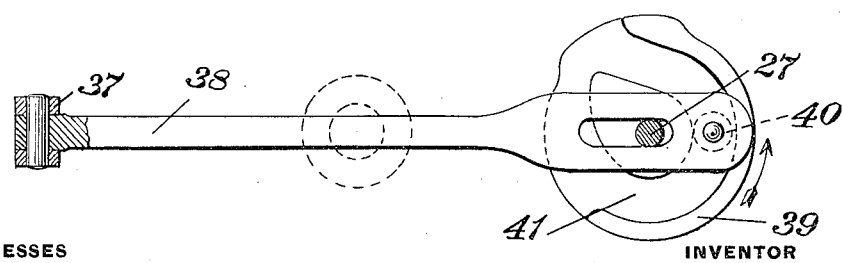

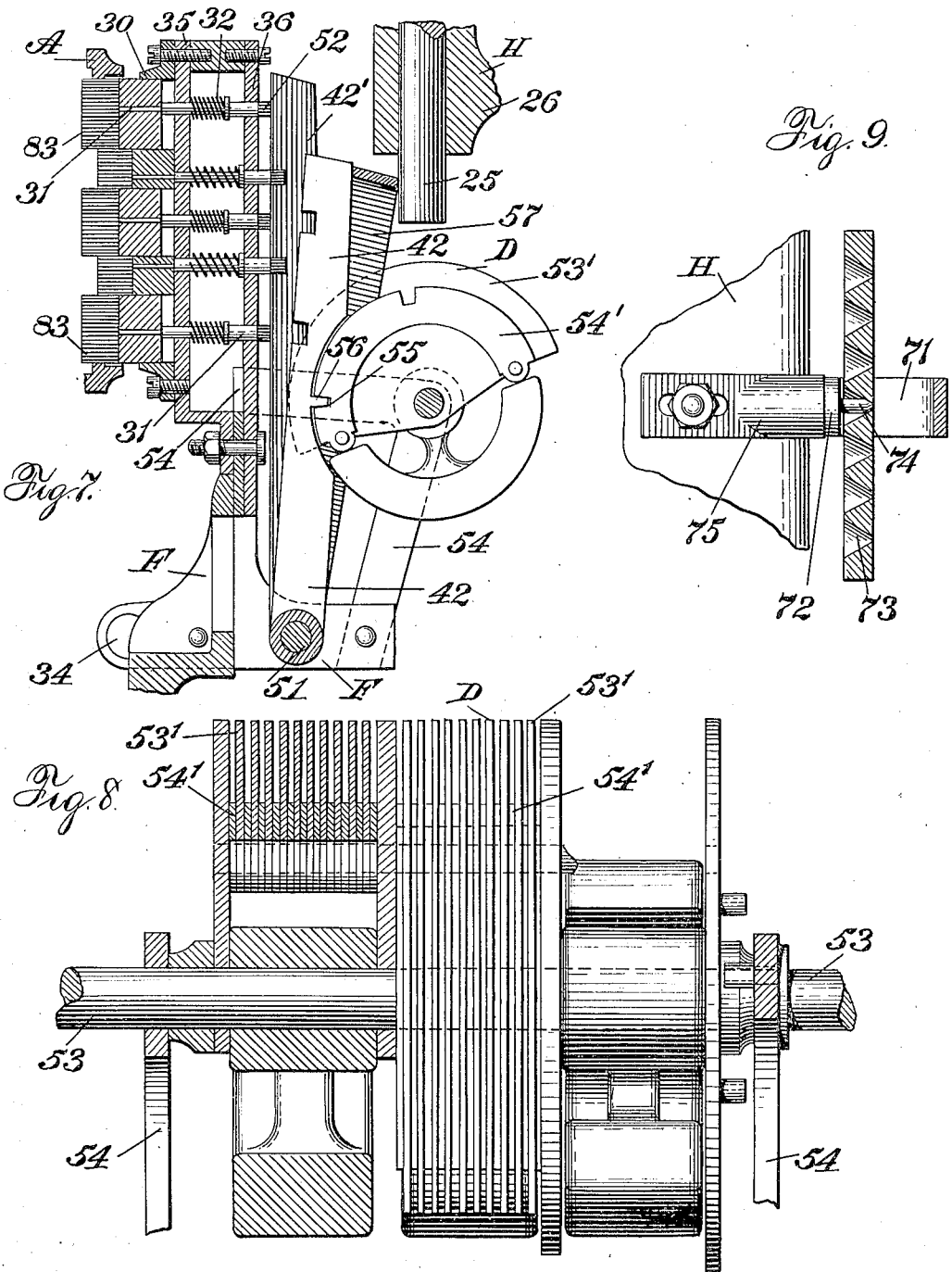

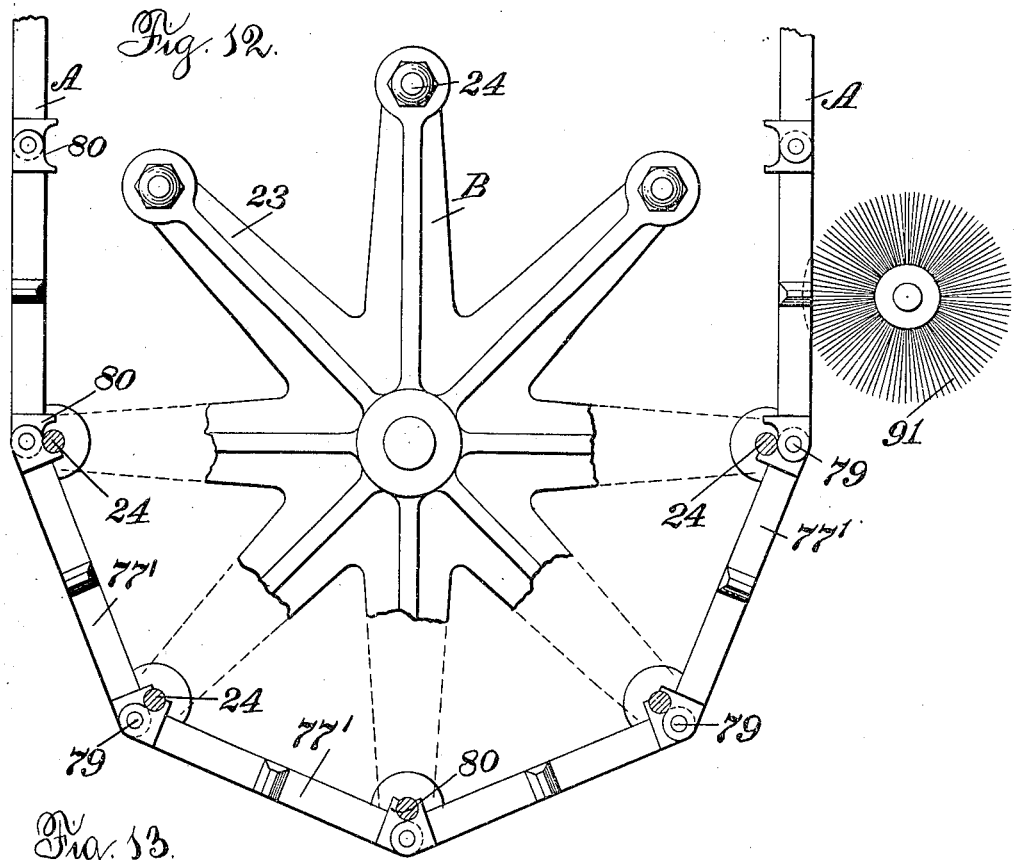
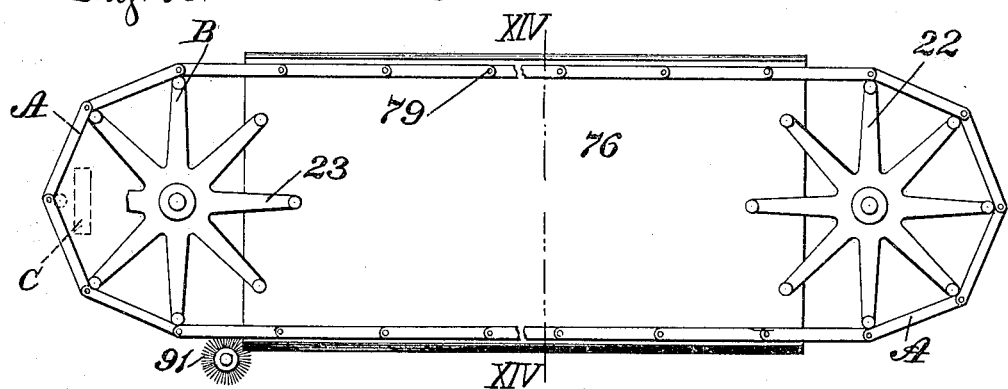
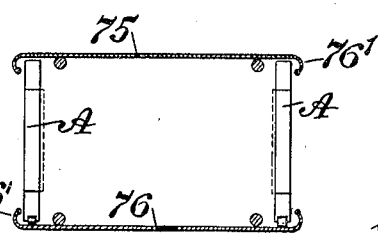

No. 891,949. PATENTED JUNE 30, 1908.
F. C. NEWELL.
MUTOGRAPH.
APPLICATION FILED APR. 24, 1906.
10 SHEETS—SHEET 9.
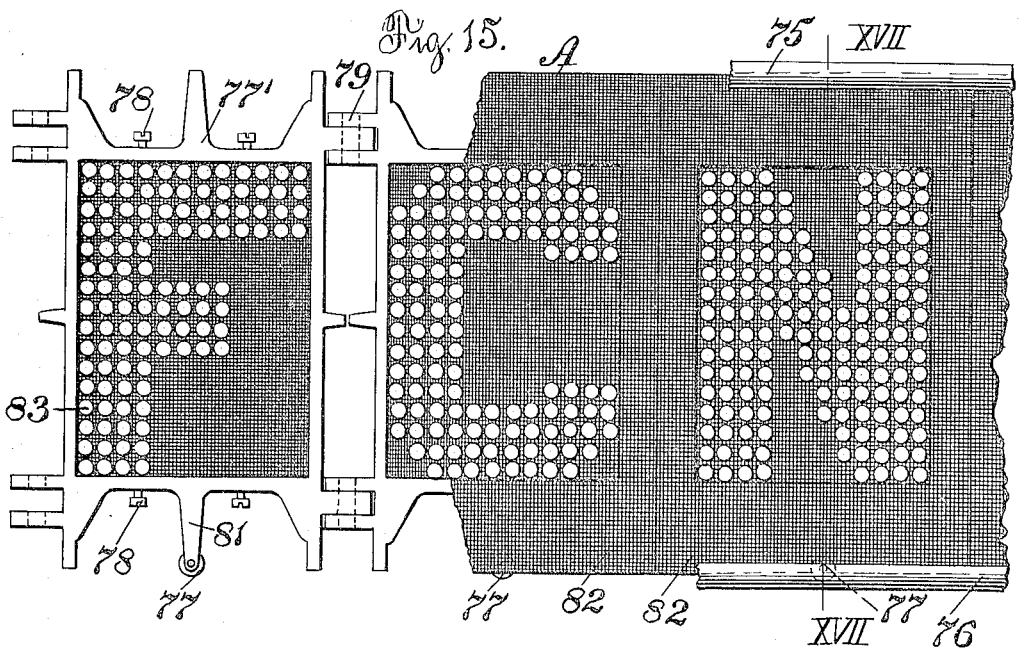
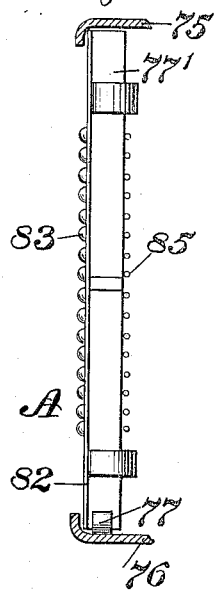
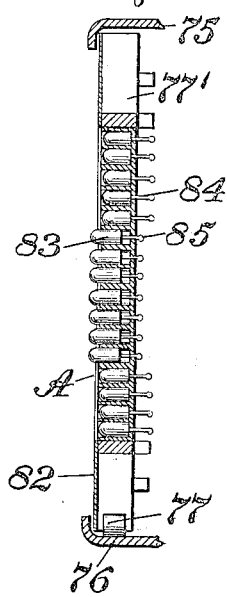
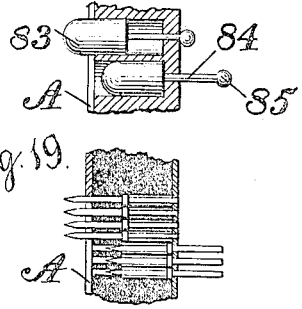
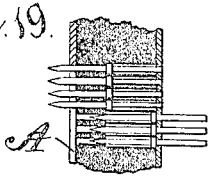
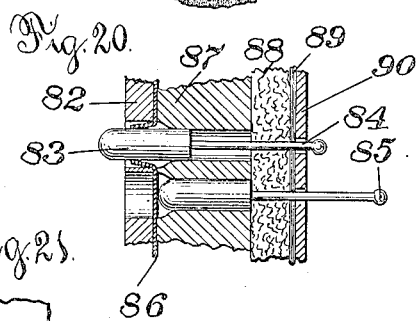
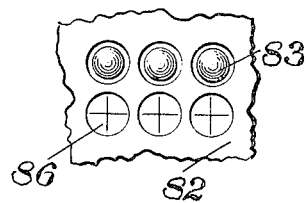
WITNESSES
J. C. Bradley
F. E. Gaither
INVENTOR
Frank C. Newell
by atty
Paul Synnestvedt

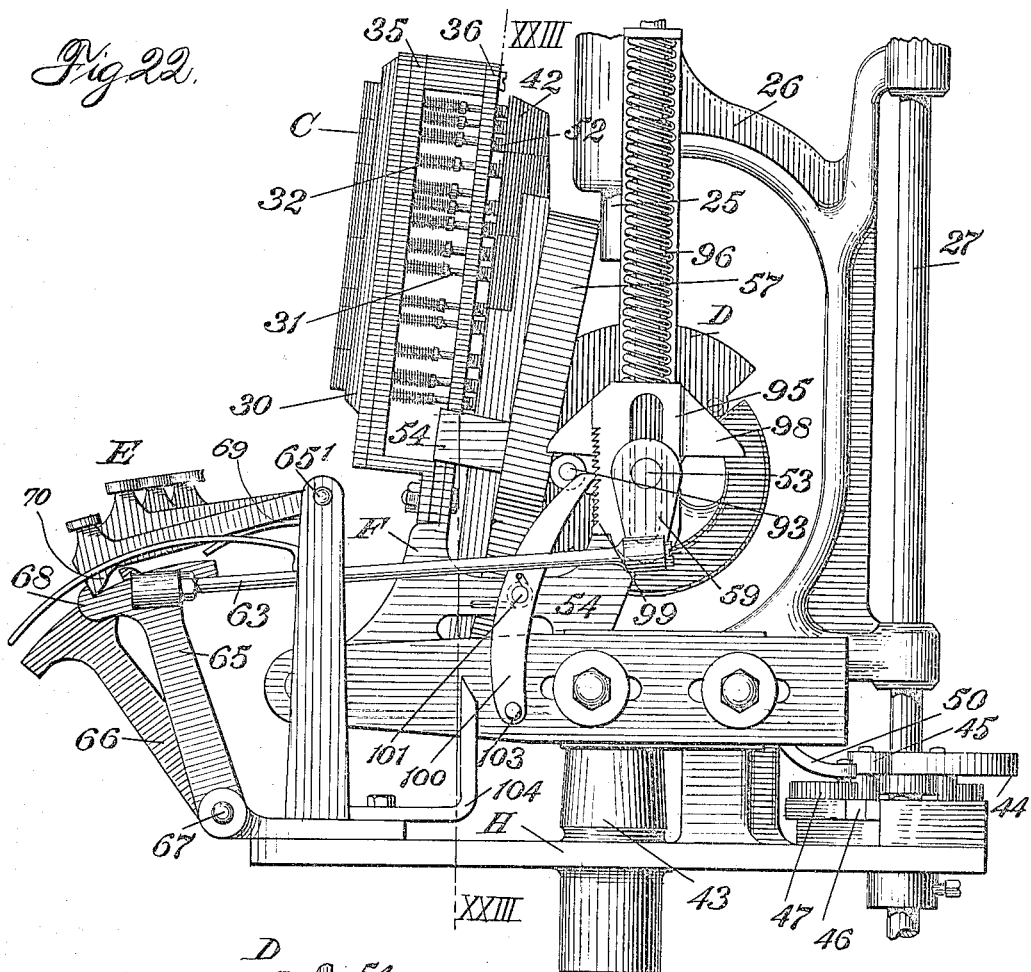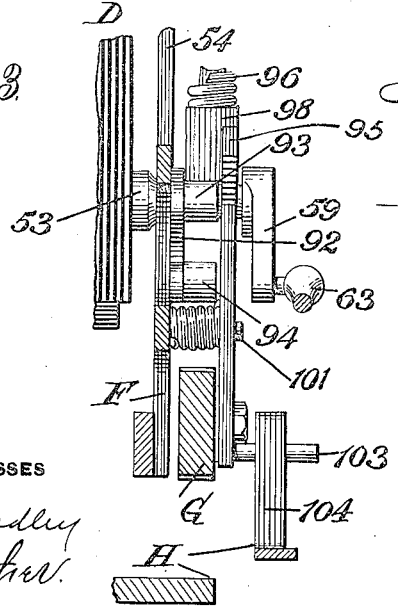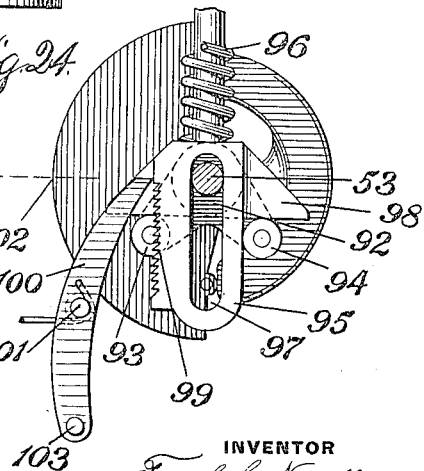

UNITED STATES PATENT OFFICE.

FRANK C. NEWELL, OF CLEVELAND, OHIO, ASSIGNOR TO THE F. C. NEWELL MUTOGRAPH CORPORATION, OF CLEVELAND, OHIO, A CORPORATION OF NEW JERSEY.

MUTOGRAPH.

No. 891,949.   Specification of Letters Patent.   Patented June 30, 1908.

Application filed April 24, 1906. Serial No. 313,513.

*To all whom it may concern:*

Be it known that I, FRANK C. NEWELL, a citizen of the United States, residing at Cleveland, in the county of Cuyahoga and State of Ohio, have invented certain new and useful Improvements in Mutographs, of which the following is a specification.

The invention relates to mechanism for reproducing and exhibiting symbols or inscriptions for advertising and other purposes, and particularly to that type of mechanism in which the symbols are formed and displayed upon a traveling band. The invention has for its principal objects; to produce a mechanism of this character in which the band employed may be used repeatedly and continuously, and is in fact indestructible; to provide a device in which the impressing mechanism consists of a single changeable mosaic capable of producing all of the desired symbols whereby an exceedingly compact mechanism with a single set of operating means is secured; to provide a mechanism in which the motion of the band and the operation of the machine is continuous; to provide a machine in which the production of the desired symbols may be easily controlled from the key-board; to provide a display mechanism in the use of which all inks and coloring materials may be avoided; and to provide a stipple member capable of producing in relief on its face raised symbols applied in its back. One form of mechanism by which these and many other objects are attained, is described hereafter as illustrated in the accompanying drawings, in which—

Figure 3ª is a view similar to that of Figure 3, but with the frame oscillated to its extreme position;

Figure 5 is a longitudinal section on the line V—V of Figure 3, showing the belt A in dotted lines and the mosaic plate C in retracted position;

Figure 6 is a transverse section through the machine, on the line VI—VI of Figure 5;

Figure 7 is a transverse section through the base plate and the operating mechanism, and shows the parts in position for pressing the symbol upon the band;

Figure 8 is an enlarged detail partly in section, of the rotary selector D;

Figure 9 is an enlarged sectional detail on the line IX—IX of Figure 1, and shows the supplemental rectifying device;

Figure 12 is a partial plan view showing the manner in which the sectional band engages the operating turret B;

Figure 13 is a diagrammatic plan view showing the arrangement of the sprockets for the band, and the band in position thereon;

Figure 14 is a transverse section through the device as shown in Figure 13, on the line XIV—XIV;

Figure 15 is a face view of the exhibiting band with certain of the symbols in relief on the band, a part of the front plate of the band being broken away to more clearly illustrate the construction of the carrying links;

Figure 16 is an end view of one of the links as shown in Figure 15;

Figure 17 is a transverse section through the device as shown in Figure 15, on the line XVII—XVII;

Figure 1:
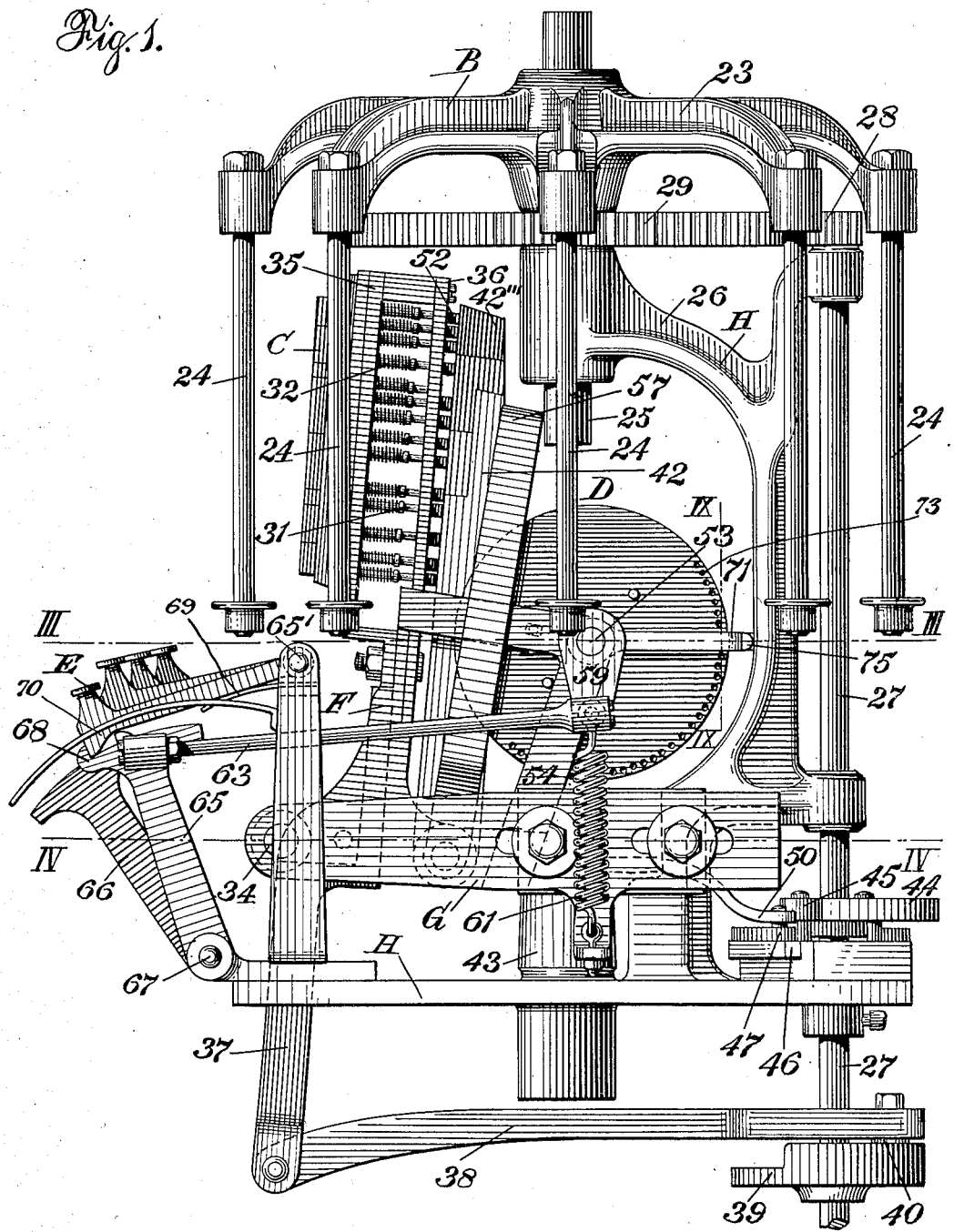
Figure 1 is a side elevation of the assembled device without the band.

Figures 18, 19, and 20, are enlarged sectional detail views showing the construction of various types of stipples;

Figure 21 is a front view of the modification shown in Figure 20, with the front plate 82 thereof removed.

Figures 22, 23, and 24 illustrate a modified means for controlling the selector and returning it to neutral position, Figure 22 being a side elevation, Figure 23 a transverse section on the line XXIII—XXIII of Figure 22, and Figure 24 a detail side view with the crank broken away to show the parts beneath.

Stated briefly, the device comprises in its preferred form an endless belt or band mechanism in which the band is adapted to be carried past the reciprocable symbol or mosaic plate whereby a series of characters are produced on the band. The mosaic plate is composed of relatively movable sections with operating means therefor whereby all the various symbols may be produced by a different arrangement of the sections comprising the plate. The variation in symbols is produced by means of a rotary adjustable member or selector as it will be called, which selector in its various positions is adapted to actuate different sets of sections in the mosaic plate to produce the various symbols. The selector is in turn governed by a keyboard. The frame-work carrying the selector and mosaic plate is oscillated back and forth in the direction of travel of the band in order that the selector and impressing symbol may have the same motion when they come together. The band which will be described in detail later, is so constructed as to show on its face in relief the various symbols impressed on its back by the mosaic plate and is made to pass the mosaic plate by means of a rotating turret constituting a part of the mechanism over which the band passes, and which in effect constitutes one of the sprockets for the belt, the other sprocket for the belt being an idler. The space intermediate the sprockets constitutes the portion exposed to view and the signs are read as produced on this exposed portion.

As shown then in assembled form in Figures 1, 2, 5, 12, and 13, the principal parts of the machine are the endless display belt A (Figures 5, 12, and 13,) supported and operated by the turret B at one end thereof which acts as a drive sprocket, the mosaic plate C made up of a plurality of movable sections from which all the symbols are to be formed in relief, and adapted to be moved against the belt, the selector D which controls the bars which operate to produce the various sets of sections in the mosaic, and by whose adjustment rotarily all of the desired symbols may be produced, the key-board E which controls the selector D to bring it into position to produce the desired symbol in the mosaic, and the carrier F for the mosaic plate C which is adapted to be reciprocated to carry the stipples against the belt, and a supporting frame G for the carrier and selector which is adapted to be given an oscillatory motion in the direction of travel of the belt, when it engages the belt to give its impression, and the main supporting frame H for the device, upon which all the other mechanism is supported.

Referring first to the band carrying mechanism, it will be seen from Figures 1, 12, and 13, that the turret B constitutes one of the band sprockets, while the idler member 22 constitutes the other sprocket, between which the endless band A is carried. The drive for the band is the turret B, which as shown in Figure 1, consists of a spider frame 23 provided with depending arms 24 adapted to engage the belt, and supported pivotally on the shaft 25 carried by the arm 26 of the stationary frame H. The driving mechanism for the turret includes the drive shaft 27 connected to a continuously operating motor (not shown) and the gears 28 and 29 keyed to the shafts 27 and 25 respectively. The band itself, together with the means for engaging and guiding it will be described hereafter in detail.

One of the principal features of the device is the mosaic plate C for impressing the symbols upon the band shown clearly in Figures 2, 5, 7, 10, and 11. As shown here, the surface of the plate is divided into a plurality of mosaic sections reciprocably supported in a frame 30, and each supported by pins 31 provided with springs 32 normally intended to force the section to its rearmost position. By allowing certain of these pins to be operated by the springs to force them back the other sections may be allowed to stand out in relief, forming the desired symbol. In Figure 5 all of the sections are held in their forward position and the front of the plate is smooth, while in Figure 7 which indicates the plate at the time it engages the belt, a part of the pins have been allowed to fall back, thereby leaving a symbol on the face of the plate, which in the present instance is the figure 5, shown in Figure 2. As shown, the plate is divided into about sixty sections, by which all the letters and the numerals up to 9 may be produced in the block style. It has been a matter of considerable difficulty to arrange the sections in proper shape and size to produce all desired combinations, but the manner in which it is accomplished will be apparent without detailed description, by an inspection of Figures 2 and 10, in which the manner of securing the figure 5 is indicated. It is of course clear that other mosaics might easily be designed with different styles of letters and with other symbols than letters and figures, the arrangement shown being preferable, however, because of the simplicity and clearness of the block letters. The mosaic plate must necessarily be reciprocated bodily to impress the raised symbol on the band A, and in order to accomplish this result the oscillatory frame-work F is provided (see Figure 5.) This frame-work is pivoted to the frame-work G at 34 and comprises an upper portion carrying the parallel plates 35 and 36 in which the pins are slidably mounted, and the depending arm 37 to which is attached the actuating arm 38. The arm 38 is actuated by a cam 39 on the drive shaft 27. The actuating arm is provided with an antifrictional roller 40 which engages the cam groove 41 (Figure 6). This groove is so shaped that the mosaic plate is gradually advanced until it engages the band and then permits the rapid retirement of the plate by virtue of its weight, which is possible, as the pivot 34 is to the left of the center of gravity of the frame F. It will be seen that the plate is reciprocated to engage the band at each revolution of the shaft 27. There is also mounted upon the oscillatory frame F a set of bars 42, 42', 42'', etc., for engaging the pins 31, and the rotary selector D which governs the production of the symbols on the mosaic, which bars and selector D will be more particularly described hereafter. In order that there may be no stop of the band necessary in order to allow the symbols to engage the band, means are provided for oscillating the mosaic plate about a vertical axis, whereby at the moment the symbol engages the belt it will be moving in the same direction and at the same speed as the band, and whereby the mosaic plate will return to its starting position after it engages the band. This result is accomplished by mounting the reciprocatory frame F upon the frame G pivoted on the trunnion 43, which frame G is oscillated from the drive shaft 27 by means of the cam 44 (see Figures 3, 4 and 5), keyed to such shaft and engaging the rolls 45, which rolls are mounted on the slide 46, guided as indicated, in an oblique direction. Connection is made between the slide 46 and the frame G for oscillating it, by means of the arm 47 pivoted at one end at 48 to the slide, and at the other end at 49 to the arm 50 on the frame G. It will be seen from the foregoing that means are provided for oscillating the mosaic frame laterally and for giving it a motion transversely to the belt.

Figure 11:
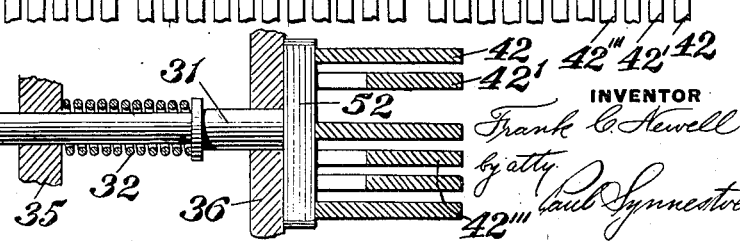
Figure 11 is an enlarged detail section showing the operating pin for one of the sections of the base plate and the spring for normally holding such section in advanced position.

The means of controlling the desired symbol for the belt will now be more particularly set forth. This controlling means comprises two mechanisms,—namely, the bars 42, 42', 42'', etc., and the rotary selector D. The bars are all pivoted to the frame F by the rod 51, and engage the cross members 52 (see Figures 7, 10 and 11) on the rear ends of the pins 31, while the selector D is rotarily mounted on the rod 53 carried by rigid arms 54 which constitute a part of the frame F, and engages the rear of the bars 42, 42', 42'', etc. in such a way that at the various points of its rotary adjustment it will allow different combinations of bars under the influence of the springs 32 to be pressed back. As indicated in Figure 8, the selector D is built up of a plurality of large disks 53' with interspersed smaller ones 54', thereby forming slots for the reception of the rear of the bars 42, 42', 42'', etc. The smaller disks 54' against which the backs of the bars bear are provided with notches 55 (see Figures 5 and 7) into which notches the projections 56 on the backs of the bars are adapted to fall when the selector is turned to the proper extent. When the selector is turned to the proper position so that its notches are in position to engage the desired projections 56, the frame F and actuating bars are moved toward the band A by means of the cam 39 and the arm 38, and those bars having the projections in place to engage the notches fall to the rear of the other bars, whereby the mosaic sections connected to such other sections are left in relief and constitute the symbols, and the plate advanced bodily to the position of Figure 7. In order that the selector may be turned freely in coming to its desired position it must of course be disengaged from the projections 56 on the bars, and in order to accomplish this the stop 57 is provided. This stop comprises a bent strap pivoted at 51 and adapted to engage at its upper end the shaft 25 and the backs of all the actuating bars, and prevent any further movement backward of such bars. As shown in Figure 5, the frame F with the selector D is in its rearmost position, in which position the selector is to the rear of and disengaged from the bars 42, 42', 42'', etc., and is free to revolve in any desired position. As shown, the selector has an operative surface extending around about 180°, and this 180° is divided into fractional parts so as to produce all the letters of the alphabet and the numerals at some part of the segment. For convenience in operation it is desirable to have the selector return to a predetermined position after each actuation, and to accomplish this I provide the shaft 53 with a pair of cranks 59 and 60 at either side of the selector, at an angle of 90° to each other, and secured thereto are the springs 61 and 62 which will normally bring the selector after each operation, so that the central part of the operative 180° segment is adjacent the projections 56 on the backs of the actuating bars, at which position the selector is so notched as to receive the projections 56 on all of the bars, and as all the bars may fall back no symbol is produced on the mosaic plate. It will be apparent from an inspection of the mosaic plate that a very compact arrangement of operating mechanism is necessary, and in order to illustrate clearly the way in which the actuating bars for the various sections are arranged to secure such compactness, I have shown in Figure 10 a diagrammatic view of the sections of the mosaic, including the cross pieces 52 secured to the ends of the pins 31, and the actuating bars 42, 42', 42'', etc. The actuating bars are adapted to engage the cross pieces 52 at portions of their length and are notched to clear such cross pieces 52 at other portions of their length. For the sake of illustration I have shown those portions of the actuating bars which engage the cross pieces, in section, and the notches on such bars in dotted lines. By the use of the cross pieces 52 a single bar as 42, can be made to operate a section of the mosaic, not in line with it, and a section may be operated by any one of a number of bars. By cutting the notches in the actuating bars it is possible to actuate the sections at the top of the mosaic without operating the lower ones, and to operate two sections in line vertically without operating intermediate sections. Figure 11, which is a sectional view, shows the manner in which the various bars engage the cross piece 52 while certain other bars pass such bar without engaging it, by reason of the notches. It is thought that the arrangement and principle will be clear without a detailed description of the operation to secure the various letters, but to illustrate with the figure 5 shown on Figure 2 of the drawing, it may be stated that in order to form such figure 5, the bars marked $x$ in Figure 10 have their projections 56 engaging in the notches 55 in the selector whereby such bars and the sections supported thereby by means of pins 31 drop back, leaving all of the other sections in relief to form the figure 5.

Figure 2:
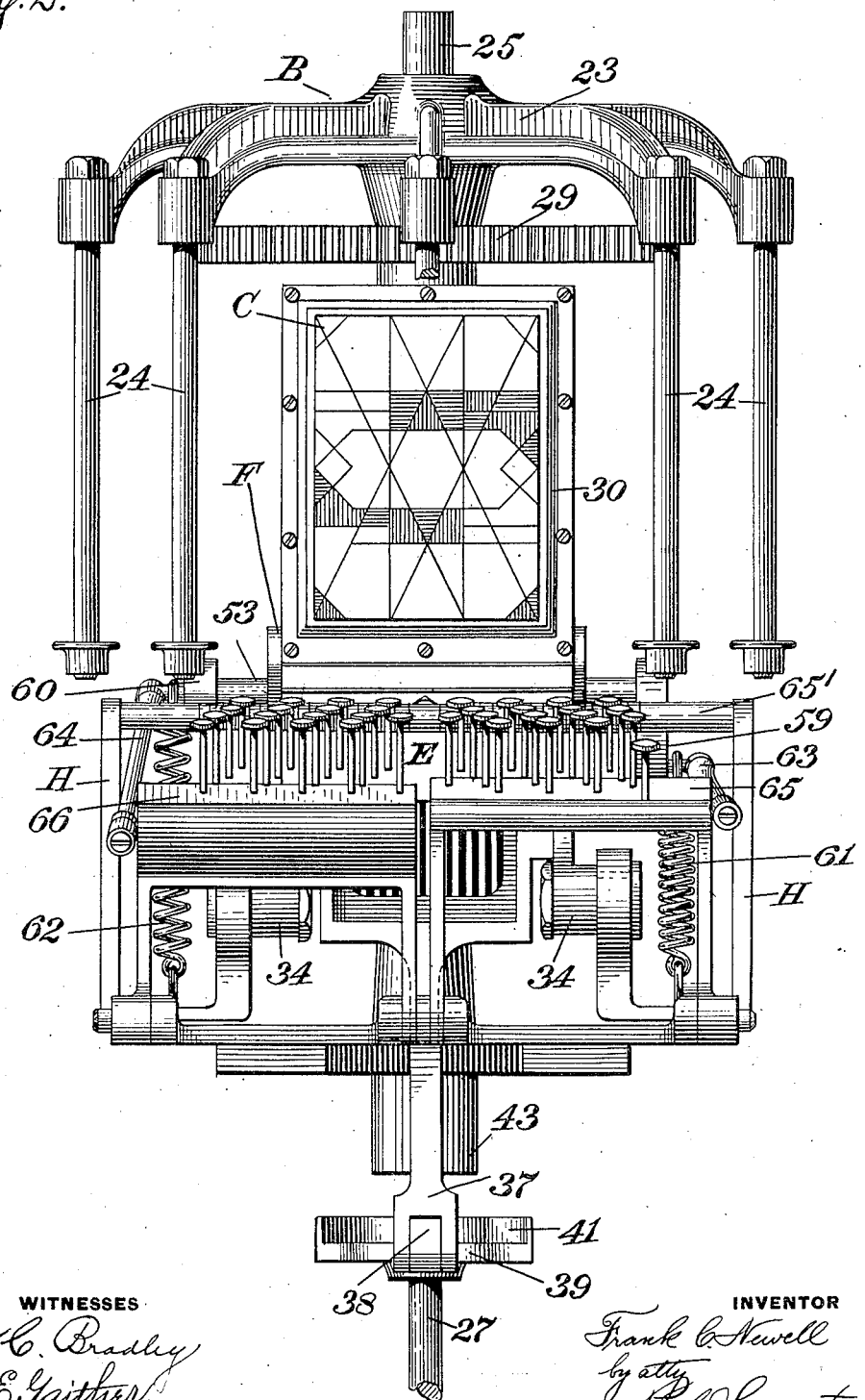
Figure 2 is a front view thereof.
Figure 3:
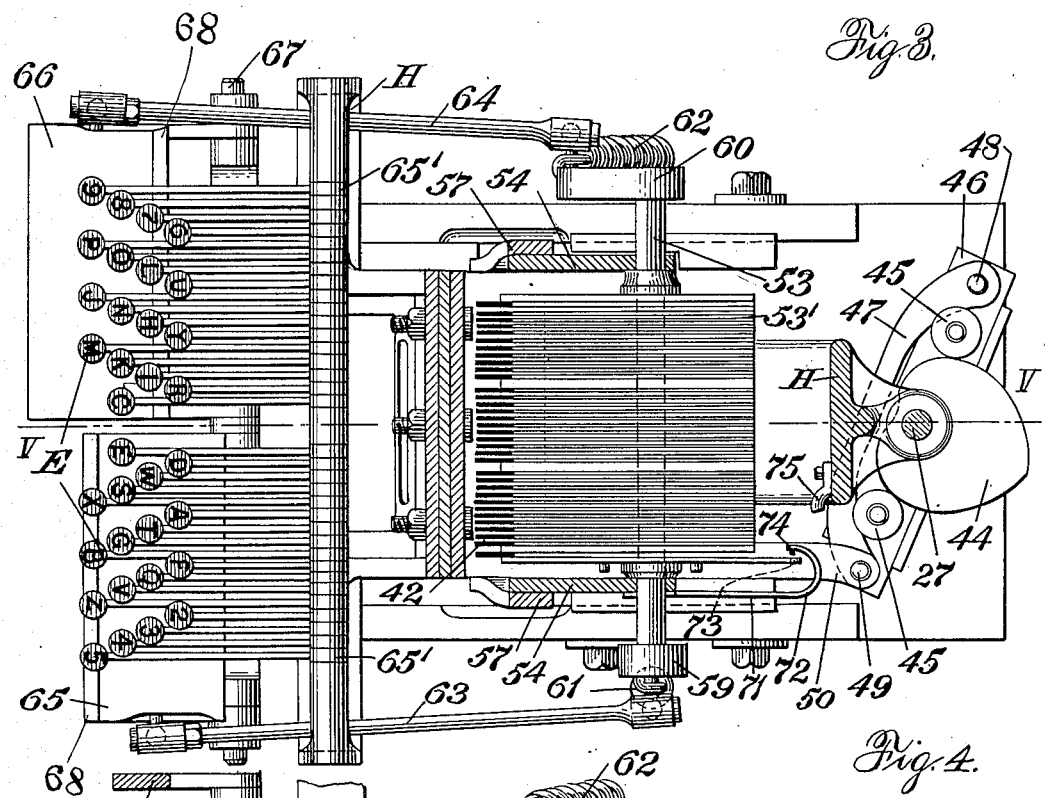
Figure 3 is a transverse section on the line III—III of Figure 1.
Figure 4:
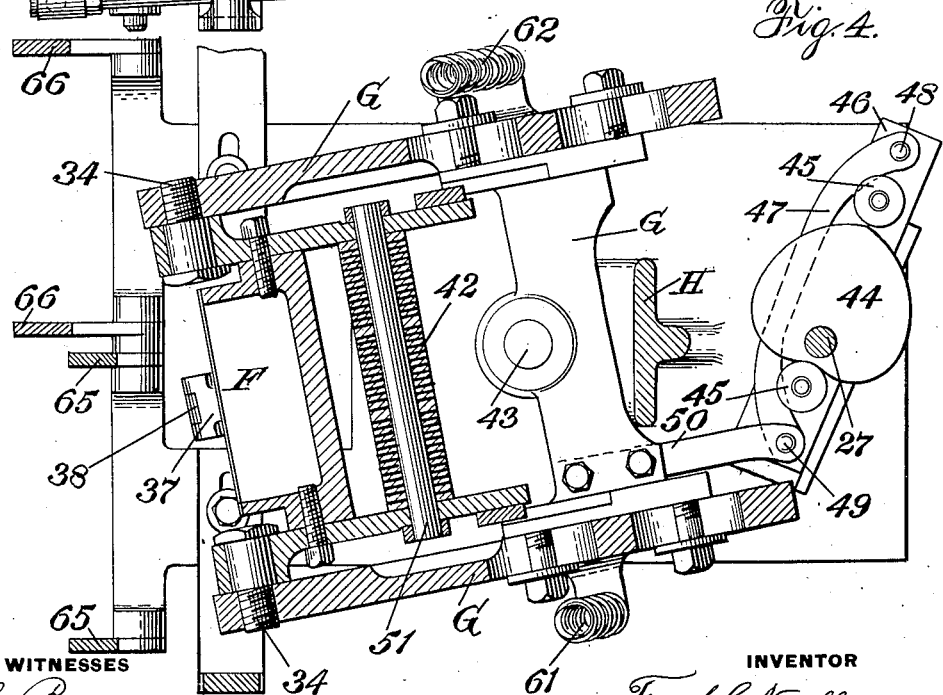
Figure 4 is a transverse section on the line IV—IV of Figure 1 with the operating mechanism in a different stage from that of Fig. 3.
Figure 10:
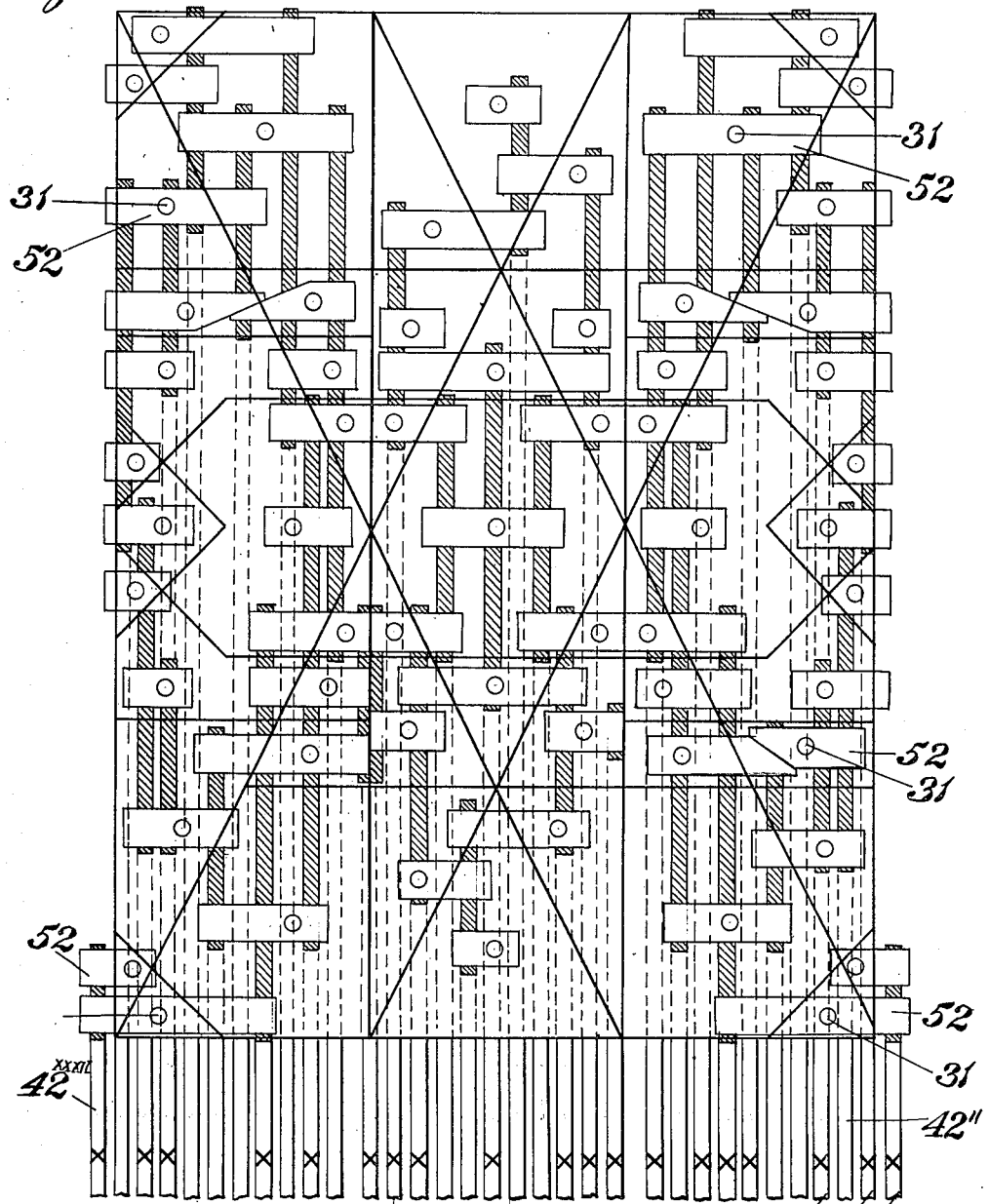
Figure 10 is an enlarged purely diagrammatic view of the face of the mosaic plate, and indicates the arrangement of the actuating bars for operating the various sets of sections to produce the symbols.

Another important feature of my invention is the keyboard control whereby the selector D may be made to rotate to the position to produce any desired symbol. The selector may be connected for operation, from the keyboard a number of ways, but in the present instance I prefer to utilize the lateral oscillation of the frame about the center 43 to oscillate the selector, for which purpose the cranks 59 and 60 are provided with forwardly extending connecting rods 63 and 64, which rods are connected to the key engaging means 65 and 66 adapted to be engaged by the lower part of the key, which keys are pivoted to the stationary frame H at 65'. As shown in Figures 2 and 3, the keyboard is divided into two sections, and the keys of one section are adapted to operate the connecting rod 63, and the keys of the other section to operate the connecting rod 64. The connecting rod 63 with its half of the keyboard operates the selector from the center of the operative 180° segment to one extreme of the segment, and the other arm 64 and its keyboard section operates the selector through the rest of the segment. The setting of the selector D occurs during the swing of the frame G about its center 43 as it moves from the position of Figure 3$^a$ to that of Figure 4. The connections whereby the keyboard actuates the connecting rods 63 and 64 are shown in Figures 1 and 5, and as here shown the connecting rods are secured to the cranks 59 and 60 by means of universal joints, and also to the key engaging members 65 and 66 by similar joints. Describing first the side of the keyboard shown in Figure 1, it will be seen that the member 65 is pivoted at 67 and carries at its top an engaging hook or ledge 68 adapted to be engaged by the lower projection on the keys. The keys are normally held up by springs 69, and are each provided on the underside with an engaging point 70 for the ledge 68. As indicated in Figure 3, the ledge 68 extends across the extent of the keyboard section and is adapted to engage all of the key points 70. The key points 70 are each a different distance from the selector, and when the ledge 68 engages the various key points during the swing of the oscillatory frame, the selector will be rotated. The distance between the selector and the various keys is such that when the key is operated the selector will be rotated the proper distance to bring the notches on the selector in position to produce each letter on the mosaic plate. The other side of the keyboard is similarly arranged, with the exception that the hook on the key engaging member 66 and on the keys is reversed, which is necessary in order to turn the selector in the reverse direction during the backward oscillation of the frame G. The key engaging member and the key points are so curved that they will not engage when the parts are moving in the wrong direction, whereby all danger of accident is avoided in case the keys should be pressed down on the wrong side during the operation of the frame. It will be seen from Figure 3$^a$ that the engaging ledges 68 on opposite sides of the machine are moved to their extreme forward and backward positions respectively when the supporting frame G is oscillated to its extreme position, and that the ledges are in position to engage any of the key points before the machine reaches its other extreme position as indicated in Figure 4. The springs 61 and 62 normally bring the selector to neutral position after each actuation, so that in no case need the actuation of the selector by the connecting rods be through more than an arc of 90°. In order to assure the positive positioning of the selector for each letter, I provide a supplementary rectifying device for assisting the springs 61 and 62. This device is shown in Figures 1, 3, and 9, and comprises a spring 71 secured to the arm 54 and having the recurved end 72 opposite the rim of the selector, which recurved end carries the pin 74. The rim of the selector is provided with beveled perforations 73 as indicated in Figure 9, and these perforations are arranged in such position that when engaged by the pin 74 in the recurved end of the spring the selector will be in exact position for actuation. In order to cause the engagement of the pin with the perforations at the end of each stroke a stop 75 (see Figure 3) is provided on the frame, which is adapted at the extreme end of the swing of the same to engage the end of the spring and force the pin into the hole 73 in the rim. By reason of their tapering shape the holes 73 will bring the selector to the proper position.

I will now describe in detail the band which I prefer to use with the device as heretofore described. As previously set forth in connection with Figures 13 and 14, one end of the band is carried and driven by the turret B which acts as a sprocket, while the other end is carried by the idler sprocket 22. Intermediate of these two sprockets the band is inclosed by a casing consisting of a bottom member 76 and a top member 75. These members curve over the top and bottom of the band as indicated at 76', so that the edges of the band are concealed from view. The band which I use is ordinarily a heavy one and must necessarily be supported intermediate its ends, and for this purpose I provide a plurality of spaced rollers 77 arranged along the underside of the band and adapted to run upon the lower casing of the band, thereby holding it level. The band which I use may be termed a stipple belt, and consists primarily of a flat supporting section provided with a plurality of very closely spaced small holes in which are fitted a large number of transversely movable pins or stipples, which pins are somewhat longer than the width of the belt and are adapted to be forced out with their faces projecting beyond the front of the belt. The ends of these stipples are of a color contrasting to that of the belt, and when the ends of such stipples are forced out in any configuration they will show up clearly against the background of the belt. There is of course means for retracting the stipples not in use so that their faces lie back of the face of the belt and are concealed from view, so that all that is visible of the stipples are the ends of the projected stipples. The band may be a continuous flexible member, as for example a thick leather belt, but preferably I make it in sections or links each of which constitutes a stipple plate and is large enough to receive one symbol. The speed of the belt is just sufficient to provide one link for each actuation of the mosaic plate. It will be seen that when the plate is carried past an oscillating symbol in relief that those stipples opposite the raised portion of the symbol on the mosaic plate will be pressed forward and that such stipples will be projected from the plate in the form of the symbol impressed against the back of the plate, forming a letter in color contrasting to that of the belt. As the stipples are comparatively small it is found that the separate stipples are not observable, and that the effect produced is that of solid letters. Figure 15 of the drawing illustrates the effect produced when the stipples are pressed through the plate, showing the letters F C N. A part of the face of the figure is broken away to illustrate more clearly the construction of the plates which are flexibly connected together. The plate consists of a metal framework 77' and an inclosed plate detachably secured thereto by means of set screws 78, and provided with transversely movable stipples. The plates are secured together in a flexible manner by means of pivots 79, and the engaging lugs are recurved as indicated at 80 in Figure 12, in order to fit the downwardly depending members 24 of the turret (see Figure 1). By the engagement of these members 24 on the turret a positive chain drive is secured for the belt, and the positioning of the plates comprising the belt is made accurate. The roller 77 which support the lower part of the belt are secured to the belt by means of arms 81 projecting downwardly from the center of the framework 77. The front of the band is composed of a series of plates 82, as indicated in Figure 15, which plates come together at their edges and project above the overhanging portion 76' of the casing 75 and 76. A smooth-faced belt is thus secured, the framework being secured by such plates 82, and a band of very neat appearance is thus secured. In Figure 17 a transverse section through the stipple belt is shown, on the line XVII—XVII of Figure 15. It will be seen from this view that part of the stipples are pushed out, thereby exhibiting the ends thereof, while the other stipples are so withdrawn into the band that these heads do not show from the front. This is more clearly shown in larger detail in Figure 18, in which the stipple member has the enlarged end 83 and the small shank 84, provided with a ball 85 to keep the stipples from being pushed through to the outside. The upper stipple is in exhibiting position, while the lower stipple is shown as shoved back, in which position the head, because of the shadow cast by the wall of the stipple hole is partly visible from the front. If the plate is looked at at an angle, as from below, which is ordinarily the case in an exhibiting device, the head would not be visible at all. The head of the stipple may be white and the band black, or this arrangement reversed by making the heads black and the band white, the object being of course to make the sign as distinct as possible.

In Figure 19 I have illustrated another modification in which the form of the stipple has been changed. As shown in this figure, a very small stipple is used, and the head is made in the form of a wedge, which form is very desirable where a small stipple is desired, and is intended to be exhibited at short range.

In Figure 20 I have shown a preferred arrangement in which I use a composition framework for the stipple member. As here shown, the front plate 82 is the same as has been heretofore described, and the stipple is the same, but the rear part of the plate is made entirely different, in order to accomplish certain desirable results and functions.

Back of the plate 82 is a thin sheet of rubber 86, which sheet of rubber is slitted opposite the stipple holes, as indicated in the lower line of holes as shown in Figure 21, so that the stipple may be pressed therethrough as indicated in Figure 20, the flaps of the rubber being doubled back as shown, and when the stipple is withdrawn as indicated in the lower part of the figure, the flaps of the rubber spring back into place as indicated, thereby completely covering the end of the stipple. Means is thus provided whereby the stipple may be absolutely concealed when withdrawn into the body of the plate. The back of the body of the plate 87 is a resilient layer of material 88, preferably felt, whose object is to yieldingly engage the shank of the stipple and prevent any inadvertent movement thereof either forward or backwardly before the proper time. A metal backing plate 90 is provided, and intermediate this back and the layer 88 I provide a second flexible sheet of rubber 89 for engaging the head of the stipple. As an endless band is used, it will be apparent that means must be provided for pushing the stipples back into the plates before reaching the operating mosaic plate again. This may be accomplished in a variety of ways, but the simplest and most effective, and the one which I here employ, is shown in Figures 12 and 13, and comprises a resilient roller 91 which is adapted to be pressed tightly against the face of the stipple plate, and force the stipples back into the desired position. It will thus be seen that the stipple band is practically indestructible and may be used over and over again to produce clearly and accurately any impression impressed against its back by the mosaic plate. It will also be apparent that the band might easily be illuminated if desired, in order to use the device at night.

The operation of my device is as follows: Power being applied to my drive shaft 27, such drive shaft is revolved and by means of the gears 28 and 29 revolves the turret B, thereby carrying the endless band A about such turret and the idler sprocket 22. The revolution of the shaft 27 also oscillates the mosaic plate by means of the cam 39 on such shaft and the connecting arms 37 and 38, thereby carrying such mosaic plate adjacent to and away from the belt by means of the shaft 27. When the selector D is in neutral position the notches 55 thereof receive the projections 56 on the backs of the actuating bars and the springs 32 carry all of the sections of the mosaic back, so that none of them touch the stipple band when the plate reaches its forward extreme. Simultaneous with the forward oscillation of the mosaic plate, the frame F which carries such plate is given an oscillatory motion in the direction of travel of the belt, by means of the cam 44 on the shaft 27 which engages the rollers 45, and by means of the arm 47 indicated in Figure 4, swings the plate forward in the direction of travel of the band, and at the same speed as the band, and returns such plate to its starting point again. No impression will therefore be imprinted on the stipple band as long as no key is actuated, for the reason that the selector will be held in neutral position by the mutual action of the moving springs 61. If now the key to produce the numeral 5 is actuated (Figures 1, 2, and 7) such key will be pressed into the position shown in Figure 1, and while the frame G is oscillating laterally on its pivot 43 the selector will be turned from its neutral position because of the connecting rod 63 being held in the position indicated. At the end of this swing, by reason of the engagement just described, the selector will be turned to the proper position to receive in its notches the projections on the backs of the bars marked x in Figure 10. At the same time the end of the spring 74 will engage the stop 75, and the pin 74 will be forced into the tapering hole 73, thereby positively positioning the selector in the proper place. At this moment the frame with its mosaic plate commences to oscillate forward away from the stop 57, and the bars x (Figure 10) because of the engagement of their projections 56 in the slots 55 in the selector can be forced back, thereby locking the selector in place, and causing the sections controlled by the bars which cannot fall back to stand out in relief, forming the figure 5. The figure standing out in relief will in the extreme forward stroke of the mosaic plate engage the stipple band, thereby driving forward the stipples in the configuration of the symbol and exhibiting such symbol on the face of the band. On the backward movement of the frame F and the mosaic plate, the parts, when they arrive in their rearmost position, will be in position for a new operation, and the selector will have fallen back to such a position that it will be disengaged from the actuating bars and will have been returned to its neutral position by the operation of the springs 61 and 62. The parts are now in position for a new letter, and the operation may be repeated as before.

In Figures 22, 23 and 24, I have illustrated a modified arrangement of mechanism for returning the rotary selector to its neutral position, and also for holding it at its set position during the forward movement of the mosaic plate. This construction is in many respects preferable to the one heretofore described, for the reason that it is more positive in action and no supplemental rectifying device is necessary for bringing the selector to its exact position. As shown in Figure 24, the shaft 53 of the selector has keyed thereto the part 92, which part 92 carries at its ends the rollers 93 and 94. Slidably secured over the shaft 53 is the member 95 normally pressed down by the spring 96. This member 95 is provided with a slot 97 for receiving the shaft 53, and has positioned transversely thereof the engaging member 98 adapted to bear upon the top side of the rollers 93 and 94. The member 95 is also provided with a plurality of holding teeth 99 adapted to be engaged by the pawl 100 spring-held against the teeth 99 and carried upon the pivot 101 secured to the frame F. When the parts are in the position shown in Figure 24, the selector is in neutral position,—that is, the point 102 is in such position with regard to the actuating bars that no symbol will be produced on the mosaic plate. A movement in either direction from this position will bring the selector in position to produce the desired symbols, as heretofore described with respect to the other construction. It will be seen that because of the spring 96 the selector when not otherwise controlled will normally come to the position of Figure 24, and that a rotation of the selector in either direction will cause the rollers 93 and 94 to raise the member 98 against the resistance of the spring 96. It will be seen that this arrangement takes the place of the two springs shown in the other construction, and that the selector will be brought to its neutral position more positively by the present construction than by the two-spring arrangement. The turning of the selector to its proper position for forming the desired symbol is controlled with the present arrangement by means of the keyboard and connecting rods 63 and 64, the same as heretofore described. The purpose of the pawl 100 is to hold the selector in its desired position until the letter or figure on the mosaic is impressed on the belt, after which the pawl is released, allowing the spring 96 to bring the selector to its neutral position. The release of the pawl is secured by means of the engagement of the projecting pin 103 on the pawl with the stop 104. This engagement occurs just after the symbol has been impressed upon the belt, and as the frame drops back. The release of the teeth gives the selector time to return to its neutral position, from which position it is moved by the oscillation of the machine operating in conjunction with the connecting rods controlled from the keyboard. It will be seen that by the use of the teeth 99 the selector is absolutely and positively positioned in one direction, and yieldingly held in the other, so that the proper engagement of the selector notches with the projections on the back of the bars is secured without the use of any additional rectifying means.

It will be apparent that the structure shown may be modified to a great extent without departing from the spirit of the invention as defined in the appended claims. It is obvious that some form of band other than a stipple band might be used and that the mosaic might be modified to operate in any of the relations common to raised impressing symbols. It is also obvious that the plate is not limited to letters and figures but might be used with other characters. Means for operating the separate sections of the mosaic plate might also be arranged in other ways as the invention is of course not limited to a rotary selector or to the particular means for operating such selector. It will also be apparent that insofar as the invention is concerned it is immaterial whether the portions of the mosaic surrounding the symbol are retracted leaving such symbol in relief or whether the symbol itself is retracted leaving the surrounding portions of the plate in relief, and the term "relief" as used in the claims is intended to cover "relief" secured in both ways. All of these modifications would readily occur to one skilled in the art and could be easily worked into operative form. The stipple members are likewise capable of many uses other than the use indicated, and may be utilized in any case where it is desired to reproduce an impression in relief. It will be apparent that pictures might be effectively reproduced if the stipples were made small enough. My invention so far as this feature is concerned contemplates all uses of a structure in which relief impressions are produced on opposite sides of a plate by means of closely spaced movable stipples. It may further be stated that it is possible to make the stipples small enough to reproduce ordinary type, and on the other hand may be magnified to any desired size.

Having thus described my invention and illustrated its use, what I claim as new and desire to secure by Letters Patent is the following:

1. In combination in a display apparatus, a movable display band constructed for the display of symbols, means for forming the symbols thereon, and automatically operating means adjacent the path of travel of the band whereby the symbols may be obliterated.

2. In combination in a display apparatus, a movable endless display band constructed for the display of symbols, means for forming the symbols thereon, and automatically operating means adjacent the path of travel of the band whereby the symbols may be obliterated.

3. In combination, a mosaic plate whose surface is composed of a plurality of reciprocable sections, of such size and arrangement that a plurality of different symbols in relief may be formed from the same sections by the relative movement of the body of the plate and the different sets of the reciprocable sections, means for normally holding the sections in the same plane, springs tending to displace the sections, and means whereby various sets of sections are controlled for forming the symbol.

4. In combination, a mosaic plate with a surface composed of a plurality of reciprocable sections, of such size and arrangement that a plurality of different symbols in relief may be formed from the same sections by the relative movement of the body of the plate and the different sets of reciprocable sections means for normally holding the sections, in the same plane, springs tending to displace the sections, and a selective means for controlling the position of the said means.

5. In combination, a mosaic plate with a surface composed of a plurality of reciprocable sections, of such size and arrangement that a plurality of different symbols in relief may be formed from the same sections by the relative movement of the body of the plate and the different sets of reciprocable sections, means for normally holding the sections in the same plane, springs tending to displace the sections, a selective means for controlling the position of the said means, and a key board for controlling the position of the selective means.

6. In combination, a reciprocable mosaic plate composed of a plurality of movable sections adapted to be actuated in sets to produce symbols in relief, a plurality of actuating bars for governing the sets of movable sections to produce the symbols, a selective device adapted in its various adjustments to engage the bars in such a way as to produce the various symbols, a movable frame supporting the mosaic plate, actuating bars and selective device, and means for reciprocating such frame.

7. In combination in a band display device, a movable display band a reciprocable laterally movable mosaic plate composed of a plurality of movable sections adapted to be actuated in sets to produce symbols in relief, means for governing the sets of movable sections to produce the symbols, a selective device adapted in its various adjustments to engage the said means in any desired way, means for operating such device, means for moving the plate forward, and means for giving the plate a motion in the direction of the movement of the band.

8. In combination in a band display device, a movable display band, a reciprocable laterally movable mosaic plate composed of a plurality of movable sections adapted to be actuated in sets to produce symbols in relief, means for governing sets of movable sections to produce the raised symbols, a selective controlling device adapted in its various adjustments to engage the means in any desired way, means for operating such device, means for moving the plate forward, rotatable means for carrying the display band adjacent the plate, and means for giving the plate a lateral motion equal to the speed of travel of the band.

9. In combination in a band display device, an oscillatory frame, a reciprocable laterally movable mosaic plate composed of a plurality of movable sections adapted to be actuated in sets to produce symbols in relief, means for governing the sets of movable sections to produce the smybols, a selective device adapted in its various adjustments to engage the means in any desired way, means for moving the plate forward, and means whereby the oscillation of the frame will move the selective device to its desired operative position.

10. In combination, a mosaic plate whose surface is composed of a plurality of reciprocable sections, of such size and arrangement that a plurality of different raised symbols may be formed from the same sections by the relative movement of the body of the plate and the different sets of the reciprocable sections, a plurality of actuating bars for engaging the sections in such a way that the various symbols are produced in relief, and a controlling means for the bars comprising a rotary selective device provided with a surface adapted in its various adjustments to engage the bars to produce the different raised symbols.

11. In combination, a mosaic plate whose surface is composed of a plurality of reciprocable sections of such size and arrangement that a plurality of different raised symbols may be formed from the same sections by the relative movement of the body of the plate and the different sets of the reciprocable sections, a plurality of actuating bars for engaging the sections in such a way that the various symbols are produced in relief, a controlling means for the bars comprising an oscillatory selective device having its neutral position midway between its extremes of oscillation and provided with a surface adapted in its various positions to engage the bars to produce the different raised symbols, means for normally returning the selective device to neutral position, and means controlled by a keyboard for moving the selective device to any desired position.

12. In combination, a mosaic plate whose surface is composed of a plurality of reciprocable sections of such size and arrangement that a plurality of different raised symbols may be formed from the same sections by the relative movement of the body of the plate and the different sets of the reciprocable sections, a plurality of actuating bars for engaging the sections whereby the various symbols may be produced in relief on the surface of the plate, a controlling means for the bars comprising an oscillatory selective device having its neutral position midway between the extremes of oscillation and provided with a surface adapted in its various positions to engage the bars to produce the different raised symbols, resilient means for normally holding and returning the selective device to neutral position, a keyboard, and means controlled thereby for moving the selective device to any desired position.

13. In combination in a mutograph, a rotary selector, a pair of engaging means on opposite sides of the axis of such selector, and a reciprocatory yielding means adapted to engage both of such means and hold the selector at neutral position.

14. In combination in a mutograph, a rotary selector, a pair of engaging means on opposite sides of the axis of such selector, a reciprocatory yielding means adapted to engage both of such means and return the selector normally to neutral position, and a ratchet mechanism for holding the selector temporarily at positions other than the neutral one.

15. In combination in a mutograph, a mosaic plate composed of relatively movable sections adapted to form a plurality of symbols in relief, a rotary selector for controlling the symbols to be produced by the mosaic, a pair of engaging projections connected to the selector and on opposite sides of the axis thereof, a reciprocatory cam plate bearing against such projections, means for holding such plate yieldingly against the projections, means for turning the selector to any desired position thereby actuating the cam plate against the resistance of yielding means, and means for holding the cam plate in position until the mosaic plate has become operative.

16. In combination in a mutograph, a mosaic plate composed of relatively movable sections adapted to form a plurality of symbols in relief, a rotary selector for controlling the symbols to be produced by the mosaic, a pair of engaging projections connected to the selector and on opposite sides of the axis thereof, a reciprocatory cam plate bearing against such projections, means for holding such plate yieldingly against the projections, means for turning the selector to any desired position thereby actuating the cam plate against the resistance of yielding means, and a ratchet mechanism for holding the cam plate in position until the mosaic has become operative.

17. In combination in a mutograph, a mosaic plate composed of relatively movable sections adapted to form a plurality of symbols in relief, a rotary selector for controlling the symbols to be produced by the mosaic, a pair of engaging projections connected to the selector and on opposite sides of the axis thereof, a reciprocatory cam plate bearing against such projections, means for holding such plate yieldingly against the projections, means for turning the selector to any desired position thereby actuating the cam plate against the resistance of the yielding means, a ratchet mechanism for holding the cam plate in position until the mosaic has become operative, and automatic means for tripping the ratchet mechanism.

18. In combination, a mosaic plate whose surface is composed of a plurality of reciprocable sections of such size and arrangement that a plurality of raised symbols may be formed from the same sections by the relative movement of the body of the plate and the different sets of the reciprocable sections, a plurality of actuating bars for engaging the sections whereby the symbols may be produced in relief, a governing means for the bars comprising an oscillatory selective device having its neutral position midway between its extremes of oscillation and provided with a surface adapted in its various positions to engage the bars necessary to produce the different raised symbols, means for normally returning the selective device to neutral position, a laterally oscillatory frame on which the plate and its operating mechanism is mounted, a stationary keyboard and connecting means between the keyboard and selective means whereby the lateral oscillation of the framework serves to rotate the selective means so as to produce the desired symbol.

19. In combination in a mutograph, a laterally oscillatory frame, a mosaic plate composed of relatively movable sections adapted to form a plurality of symbols in relief, a plurality of means for governing the sections, an oscillatory selector for operating the plurality of means, comprising a surface adapted in its various positions to engage any of the plurality of means and having a neutral position midway of the extremes of oscillation, resilient means for normally bringing the selector to its neutral position, a crank arm on either side of the selector provided with a connecting rod, a stationary keyboard, part of the keys of which are adapted to operate one of the connecting rods and the remaining portion the other connecting rod, all arranged so that when a key engages a connecting rod the lateral oscillation of the frame will cause the selector to move to the proper position to produce the symbol of the key.

20. In combination in a mutograph, a frame, a rotary band carrier mounted thereon, a display band on the carrier, a mosaic plate mounted inside the band carrier and adapted to move toward and from the band, and also to oscillate laterally in the direction of motion of the band, and means for giving the plate its two motions.

21. In combination, a mosaic plate whose surface is composed of a plurality of reciprocable sections, by the relative movement of the body of which plate and the different sets of the reciprocable sections raised symbols are produced, a plurality of governing bars for engaging the sections in such a way that various symbols may be produced in relief upon the surface of the plate, and a controlling means for the bars comprising a selective device provided with a plurality of grooves for receiving the bars and having an operative surface adapted in its various adjustments to engage the bars to produce the different raised symbols.

22. In combination, a mosaic plate whose surface is composed of a plurality of reciprocable sections, of such size and arrangement that a plurality of different relief symbols may be formed from the same sections by the relative movement of the body of the plate and the different sets of the reciprocable sections, means for normally holding the sections in the same plane comprising a plurality of bars with projections on the rear thereof, springs tending to press the sections and bars rearward, and a notched selective member adapted to receive the projections on the bars whereby in its various positions certain of the bars and the corresponding sections may drop back under the influence of the springs, leaving the other sections in relief to form the symbol.

23. A mosaic plate whose surface is composed of a plurality of reciprocable sections, of such size and arrangement that a plurality of different relief symbols may be formed from the same sections by the relative movement of the body of the plate and the different sets of the reciprocable sections, means for normally holding the sections in the same plane comprising a plurality of bars with projections on the rear thereof, springs tending to press the sections and bars rearward, and a notched rotative selective member adapted to receive the projections on the bars whereby in its various positions certain of the bars and the corresponding sections may drop back under the influence of the springs, leaving the other sections in relief to form the symbol.

24. In combination, a reciprocable mosaic plate, an oscillatory frame therefor, a selective device for controlling the production of the desired symbols on the mosaic plate and means operated by the lateral oscillation of the frame for setting the selective device.

25. In combination in a mutograph, a band having a plurality of stipples movable transversely thereof and adapted to be projected with their outer ends adjacent the face of the band, a symbol in relief adjacent the band, and means for moving the band and symbol relative to each other to operate the stipples.

26. In combination in a mutograph, a band having a plurality of stipples movable transversely thereof and adapted to be projected with their outer ends adjacent the face of the band, a mosaic plate adapted to form a plurality of symbols in relief adjacent the band, means for moving the band past the plate and means for moving the band and plate relative to each other to operate the stipples.

27. In combination in a mutograph, a band having a plurality of stipples movable transversely thereof and adapted to be projected with their outer ends adjacent the face of the band, a mosaic plate adapted to form a plurality of raised symbols adjacent the band, means for moving the band past the plate, and means for moving the plate against the rear of the band to project the symbols into visible position at the front of the band.

28. In combination in a mutograph, a band having a plurality of stipples movable transversely thereof and adapted to be projected with their outer ends adjacent the face of the band, a mosaic plate adapted to form a plurality of symbols in relief adjacent the band, means for moving the band past the plate, and means for moving the plate in the direction of travel of the band and for moving the plate against the rear of the band to project the symbols into visible position at the front of the band.

29. In combination in a mutograph, a turret for carrying a stipple band, a mosaic plate adapted to form a plurality of different symbols in relief mounted in the turret and adapted to move transversely of the path of rotation of the turret, and a stipple band carried by the turret and adapted to be operated by the mosaic plate.

30. In combination in a mutograph, a turret for carrying a stipple band, a mosaic plate adapted to form a plurality of different symbols in relief mounted in the turret and adapted to move transversely of the path of rotation of the turret, and a stipple band comprising a flexible member having a plurality of stipples movable transversely of the band and adapted to be projected with their outer ends adjacent the face of the band.

31. In combination in a mutograph, a turret for carrying a stipple band, a mosaic plate adapted to form a plurality of different symbols in relief mounted in the turret and adapted to move transversely of the path of rotation of the turret, and a stipple band comprising a plurality of plates flexibly joined together and having a plurality of stipples in the plates movable transversely of the band and adapted to be projected with their outer ends adjacent the face of the band.

32. In combination in a mutograph, an endless band having a plurality of stipples movable transversely thereof and adapted to be projected with their outer ends adjacent the face of the band, a raised symbol adjacent the band, means for moving the band past the symbol and means for moving the band and symbol into contact to operate the stipples.

33. In combination in a mutograph, an endless band having a plurality of stipples movable transversely thereof and adapted to be projected with their outer ends adjacent the face of the band, a symbol in relief adjacent the band, means for moving the band past the symbol, means for moving the band and symbol into contact to operate the stipples, and means whereby the stipples may be forced back into the band again before reaching the symbol.

34. In combination in a mutograph, an endless band having a plurality of closely spaced stipples movable transversely thereof and adapted to be projected from the face of the band, a symbol in relief adjacent the band, means for moving the band past the symbol, means for moving the band and symbol into contact to operate the stipples, and a resilient roller adjacent the face of the band whereby the stipples may be forced back into the band before reaching the symbol again.

35. A stipple band comprising a flexible band having a plurality of closely spaced stipples whose outer ends are of a contrasting color to the color of the band, which stipples are movable transversely of the band and adapted to be projected so that their outer ends are adjacent the face of the band.

36. A stipple member comprising a plate and a plurality of stipples therein whose outer ends are of a contrasting color to that of the plate, which stipples are movable transversely of the plate and are adapted to lie with their outer ends adjacent the face of the plate in one position and to lie with the ends back of the face of the plate in another position.

37. A stipple member comprising a plate having a layer of resilient material and provided with a plurality of closely spaced transverse holes, and a plurality of stipples fitting snugly therein and of greater length than the thickness of the plate.

38. A stipple member comprising a plate having a layer of felt and provided with a plurality of closely spaced transverse holes, and a plurality of stipples fitting snugly therein and of greater length than the thickness of the plate.

39. A stipple member comprising a plate provided with a rubber curtain below the face thereof and a plurality of closely spaced stipples therein movable transversely of the plate and of slightly greater length than the thickness of the plate and adapted to be projected beyond the face of the plate, and be withdrawn through the rubber curtain, which curtain is slitted for the passage of the stipples.

40. A stipple member comprising a metal face, a resilient body portion, a slitted rubber curtain there between, a rubber backing and a plurality of transversely movable stipples.

41. A stipple member provided with stipples having large front portions, smaller shanks and rear heads on the shanks, and comprising in successive layers a front plate, a slitted resilient curtain, an expansive yielding material, a second resilient member engaging the shank and a rear plate provided with holes to admit the passage of the heads on the shanks.

42. In combination in a mutograph, a frame, an endless band mounted for movement thereon, a mosaic plate composed of relatively movable sections adapted to form a plurality of symbols in relief mounted adjacent the band and adapted to move toward and from the band and also to oscillate laterally in the direction of motion of the band, and means for giving the plate its two motions.

43. A stipple band comprising a flexible band having a plurality of stipples whose outer ends are of a contrasting color to the color of the band, which stipples are movable transversely of the band and are adapted to project with their outer ends adjacent the face of the band in one position and to lie with the ends back of the face of the band in another position.

44. A stipple member comprising a body portion with a plurality of transverse holes and a plurality of stipples therefor having their outer ends of a color contrasting to that of the face of the body portion and adapted to lie either with their front ends visible at the front of the body portion or with such ends back of the face of the body portion and substantially invisible.

45. A stipple member comprising a body portion, and a plurality of stipples thereon whose outer ends are of a contrasting color to that of the face of the body portion, which stipples are movable transversely of the body portion and are adapted to lie either with their outer ends advanced and visible or retracted into the plate and substantially invisible.

46. In combination in a display apparatus, a traveling endless display band, means for continuously forming symbols thereon, and automatic means for continuously obliterating the symbols.

47. In combination in a display apparatus, a traveling display band, means for continuously forming symbols thereon, and automatic means for continuously obliterating the symbols.

In testimony whereof I have hereunto signed my name in the presence of the two subscribed witnesses.

FRANK C. NEWELL.

Witnesses:
J. E. BRADLEY,
F. E. GAITHER.